(12) United States Patent
Chang et al.

(10) Patent No.: US 11,381,994 B2
(45) Date of Patent: Jul. 5, 2022

(54) METHOD FOR DELIVERING DATA PACKET, USER EQUIPMENT, AND BASE STATION

(71) Applicants: SHARP KABUSHIKI KAISHA, Osaka (JP); FG INNOVATION COMPANY LIMITED, New Territories (HK)

(72) Inventors: Ningjuan Chang, Shanghai (CN); Renmao Liu, Shanghai (CN)

(73) Assignees: SHARP KABUSHIKI KAISHA, Sakai (JP); FG Innovation Company Limited, New Territories (HK)

(*) Notice: Subject to any disclaimer, the term of this patent is extended or adjusted under 35 U.S.C. 154(b) by 0 days.

(21) Appl. No.: 16/620,414

(22) PCT Filed: Jun. 11, 2018

(86) PCT No.: PCT/CN2018/090619
§ 371 (c)(1),
(2) Date: Dec. 6, 2019

(87) PCT Pub. No.: WO2018/228326
PCT Pub. Date: Dec. 20, 2018

(65) Prior Publication Data
US 2020/0100136 A1 Mar. 26, 2020

(30) Foreign Application Priority Data
Jun. 16, 2017 (CN) .................. 201710461611.X

(51) Int. Cl.
*H04W 28/02* (2009.01)
(52) U.S. Cl.
CPC ... *H04W 28/0268* (2013.01); *H04W 28/0252* (2013.01)

(58) Field of Classification Search
CPC ............ H04W 28/0268; H04W 28/24; H04W 28/0252; H04W 28/02
(Continued)

(56) References Cited

U.S. PATENT DOCUMENTS

2014/0128075 A1* 5/2014 Dasilva ............ H04W 36/0083
455/436
2017/0064750 A1* 3/2017 Madaiah ............... H04W 76/12
(Continued)

FOREIGN PATENT DOCUMENTS

AU 2018286127 A1 1/2020
EP 3478008 A1 * 5/2019 ............ H04W 76/11
(Continued)

OTHER PUBLICATIONS

3GPP TSG-RAN WG2 Meeting #98, "Initiation of SDAP Entity" Huawei, HiSilicon; R2-1704986 Hangzhou, China, May 15-19, 2017 (Year: 2017).*
(Continued)

*Primary Examiner* — Nathan S Taylor
(74) *Attorney, Agent, or Firm* — ScienBiziP, P.C.

(57) ABSTRACT

The present disclosure provides a method performed in UE, comprising: receiving from a base station a QoS flow configuration contained in an RRC message, wherein the QoS flow configuration comprises a QoS flow identifier and at least one of the following identifiers: a PDU session identifier associated with a QoS flow indicated by the QoS flow identifier, a DRB identifier associated with the QoS flow indicated by the QoS flow identifier, an SDAP identifier associated with the QoS flow indicated by the QoS flow identifier, and an identifier of a default DRB associated with the QoS flow indicated by the QoS flow identifier; determining whether the QoS flow identifier is a part of a current UE configuration; and if the QoS flow identifier is not a part
(Continued)

of the current UE configuration, adding, in art RRC layer, the QoS flow indicated by the QoS flow identifier, and indicating to an upper layer the addition of the QoS flow through the QoS flow identifier and the at least one associated identifier; if the QoS flow identifier is a part of the current UE configuration, modifying, in the RRC layer, the QoS flow indicated by the QoS flow identifier, and indicating to the upper layer the modification of the QoS flow through the QoS flow identifier and the at least one associated identifier that are received. The present disclosure further provides a corresponding method performed in a base station, as well as corresponding UE and a corresponding base station.

4 Claims, 6 Drawing Sheets

(58) Field of Classification Search
USPC .......................................................... 370/328
See application file for complete search history.

(56) References Cited

U.S. PATENT DOCUMENTS

| | | | | |
|---|---|---|---|---|
| 2018/0279160 A1* | 9/2018 | Sayenko | ............. | H04W 88/023 |
| 2018/0324631 A1* | 11/2018 | Jheng | ................ | H04W 28/0268 |
| 2019/0028920 A1* | 1/2019 | Pan | ......................... | H04L 47/24 |
| 2019/0029057 A1* | 1/2019 | Pan | ....................... | H04W 28/12 |
| 2019/0150023 A1* | 5/2019 | Cho | .................. | H04W 28/0268 |
| | | | | 370/235 |
| 2019/0364541 A1* | 11/2019 | Ryu | ....................... | H04W 76/25 |
| 2020/0037386 A1* | 1/2020 | Park | ....................... | H04W 76/30 |
| 2020/0100134 A1* | 3/2020 | Tang | ................. | H04W 28/0268 |
| 2020/0100136 A1* | 3/2020 | Chang | .................... | H04W 28/24 |
| 2020/0154304 A1* | 5/2020 | Cho | ...................... | H04W 28/02 |
| 2020/0154390 A1* | 5/2020 | Kim | ...................... | H04W 60/00 |
| 2020/0267753 A1* | 8/2020 | Adjakple | .......... | H04W 72/1226 |
| 2020/0389809 A1* | 12/2020 | Jiang | ....................... | H04L 69/22 |
| 2021/0168882 A1* | 6/2021 | Chang | .................. | H04W 76/27 |

FOREIGN PATENT DOCUMENTS

| | | | |
|---|---|---|---|
| EP | 3641371 A1 | 4/2020 | |
| WO | 2018/228328 A1 | 12/2018 | |

OTHER PUBLICATIONS

NTT DOCOMO,"New SID Proposal: Study on New Radio Access Technology", 3GPP TSG RAN Meeting #71; RP-160671; Goteborg, Sweden, Mar. 7-10, 2016.

Ericsson,"QoS framework for NR", 3GPP TSG-RAN WG2 #97; Tdoc R2-1700842(update of R2-1700435); Athens, Greece, Feb. 13-17, 2017.

Huawei et al., "Initiation of SOAP Entity", R2-1704986 Revision of R2-1702593, 3GPP TSG-RAN WG2 Meeting #98, Hangzhou, China, May 15-19, 2017.

Huawei et al., "QoS message flows", R2-1704977, 3GPP TSG-RAN WG2 Meeting #98, Hangzhou, China, May 15-19, 2017.

* cited by examiner

METHOD FOR DELIVERING DATA PACKET, USER EQUIPMENT, AND BASE STATION

TECHNICAL FIELD

The present disclosure relates to the field of wireless communications technologies. More specifically, the present disclosure relates to a method for delivering a data packet, user equipment, and a base station.

BACKGROUND

A new research project on 5G technical standards (see non-patent literature: RP-160671: New SID Proposal: Study on New Radio Access Technology) was proposed by NTT DOCOMO at the 3rd Generation Partnership Project (3GPP) RAN #71 plenary meeting held in March 2016, and was approved. The goal of the research project is to develop a New Radio (NR) access technology to meet all of the application scenarios, requirements, and deployment environments of 5G. NR mainly has three application scenarios: enhanced mobile broadband communications (Enhanced mobile broadband: eMBB), massive machine-type communications (massive Machine type communication: mMTC), and ultra reliable and low latency communications (URLLC).

Unlike a Long Term Evolution (LTE) system that adopts the concept of evolved packet system (EPS) bearer to provide an end-to-end quality of service (QoS) guarantee for data transmission, NR has introduced a new QoS structure, namely, QoS flow-based QoS guarantee. At the NR adhoc meeting held in January 2017, RAN2 decided to introduce a new wireless protocol layer, referred to as a Service Data Adaptation Protocol (SDAP) layer, to support the newly introduced QoS mechanism. The wireless protocol layer will at least implement mapping between a data radio bearer (DRB) and a QoS flow and indication of a QoS flow for a data packet, while other functions are still under discussion. This layer is located above a Packet Data Convergence Protocol (PDCP) layer.

The present disclosure focuses on and solves the problem of how to deliver a data packet to a correct/appropriate DRB in an NR QoS architecture.

SUMMARY OF INVENTION

The objective of the present disclosure is to solve the aforementioned technical problem. Specifically, the present disclosure aims to solve the technical problem of how to deliver a data packet to a correct/appropriate DRB.

In order to achieve the aforementioned objective, a first aspect of the present disclosure provides a method performed at user equipment (UE), comprising: receiving from a base station a quality of service (QoS) flow configuration contained in a radio resource control (RRC) message, wherein the QoS flow configuration comprises a QoS flow identifier and at least one of the following identifiers: a protocol data unit (PDU) session identifier associated with a QoS flow indicated by the QoS flow identifier, a data radio bearer (DRB) identifier associated with the QoS flow indicated by the QoS flow identifier, a Service Data Adaptation Protocol (SDAP) identifier associated with the QoS flow indicated by the QoS flow identifier, and an identifier of a default DRB associated with the QoS flow indicated by the QoS flow identifier; determining whether the QoS flow identifier is a part of a current UE configuration; and if the QoS flow identifier is not a part of the current UE configuration, adding, in an RRC layer, the QoS flow indicated by the QoS flow identifier, and indicating to an upper layer the addition of the QoS flow through the QoS flow identifier and the at least one associated identifier; if the QoS flow identifier is a part of the current UE configuration, modifying, in the RRC layer, the QoS flow indicated by the QoS flow identifier, and indicating to the upper layer the modification of the QoS flow through the QoS flow identifier and the at least one associated identifier that are received.

In one exemplary embodiment, the method further comprises: further mapping, according to a mapping rule between the QoS flow identifier and the at least one associated identifier, a data packet mapped to the QoS flow identifier to an SDAP entity corresponding to the at least one identifier.

In one exemplary embodiment, the QoS flow configuration is comprised in an SDAP configuration or a DRB configuration.

In one exemplary embodiment, the modification of the QoS flow comprises: modifying an identifier in the current UE configuration associated with the QoS flow and corresponding to the at least one identifier to the at least one identifier that is received and associated with the QoS flow identifier.

A second aspect of the present disclosure provides user equipment (UE), comprising: a communication interface, configured for communication; a processor; and a memory, storing computer-executable instructions that, when executed by the processor, cause the processor to perform the following process:

receiving from a base station a quality of service (QoS) flow configuration contained in a radio resource control (RRC) message, wherein the QoS flow configuration comprises a QoS flow identifier and at least one of the following identifiers:
  a protocol data unit (PDU) session identifier associated with a QoS flow indicated by the QoS flow identifier,
  a data radio bearer (DRB) identifier associated with the QoS flow indicated by the QoS flow identifier,
  a Service Data Adaptation Protocol (SDAP) identifier associated with the QoS flow indicated by the QoS flow identifier, and
  an identifier of a default DRB associated with the QoS flow indicated by the QoS flow identifier; determining whether the QoS flow identifier is a part of a current UE configuration; and
  if the QoS flow identifier is not a part of the current UE configuration, adding, in an RRC layer, the QoS flow indicated by the QoS flow identifier, and indicating to an upper layer the addition of the QoS flow through the QoS flow identifier and the at least one associated identifier;
  if the QoS flow identifier is a part of the current UE configuration, modifying, in the RRC layer, the QoS flow indicated by the QoS flow identifier, and indicating to the upper layer the modification of the QoS flow through the QoS flow identifier and the at least one associated identifier that are received.

In one exemplary embodiment, when executed by the processor, the instructions further cause the processor to perform the following process:

further mapping, according to a mapping rule between the QoS flow identifier and the at least one associated identifier, a data packet mapped to the QoS flow identifier to an SDAP entity corresponding to the at least one identifier.

In one exemplary embodiment, the QoS flow configuration is comprised in an SDAP configuration or a DRB configuration.

In one exemplary embodiment, the modification of the QoS flow comprises: modifying an identifier in the current UE configuration associated with the QoS flow and corresponding to the at least one identifier to the at least one identifier that is received and associated with the QoS flow identifier.

A third aspect of the present disclosure provides a method performed at a base station, comprising: performing a quality of service (QoS) flow configuration for user equipment (UE), wherein the QoS flow configuration comprises a QoS flow identifier and at least one of the following identifiers: a protocol data unit (PDU) session identifier associated with a QoS flow indicated by the QoS flow identifier, a data radio bearer (DRB) identifier associated with the QoS flow indicated by the QoS flow identifier, a Service Data Adaptation Protocol (SDAP) identifier associated with the QoS flow indicated by the QoS flow identifier, and an identifier of a default DRB associated with the QoS flow indicated by the QoS flow identifier; and sending the QoS flow configuration to the UE through a radio resource control (RRC) message.

In one exemplary embodiment, the method further comprises: receiving, according to a mapping rule between the QoS flow identifier and the at least one associated identifier in the sent QoS flow configuration, a data packet on a DRB corresponding to the at least one identifier.

A fourth aspect of the present disclosure provides a base station, comprising: a communication interface, configured for communication; a processor; and a memory, storing computer-executable instructions that, when executed by the processor, cause the processor to perform the following process:

performing a quality of service (QoS) flow configuration for user equipment (UE), wherein the QoS flow configuration comprises a QoS flow identifier and at least one of the following identifiers:

a protocol data unit (PDU) session identifier associated with a QoS flow indicated by the QoS flow identifier, a data radio bearer (DRB) identifier associated with the QoS flow indicated by the QoS flow identifier, a Service Data Adaptation Protocol (SDAP) identifier associated with the QoS flow indicated by the QoS flow identifier, and an identifier of a default DRB associated with the QoS flow indicated by the QoS flow identifier; and sending the QoS flow configuration to the UE through a radio resource control (RRC) message.

In one exemplary embodiment, when executed by the processor, the instructions further cause the processor to perform the following process: receiving, according to a mapping rule between the QoS flow identifier and the at least one associated identifier in the sent QoS flow configuration, a data packet on a DRB corresponding to the at least one identifier.

By means of the method in the present disclosure, a NAS layer of UE establishes a mapping relationship between a QoS flow and an SDAP layer in an AS layer, and accordingly delivers data packets of a QoS flow to a correct SDAP entity, so that the SDAP entity transmits the data packets over an air interface through an appropriate DRB, and thus QoS of the QoS flow can be guaranteed.

BRIEF DESCRIPTION OF DRAWINGS

The above and other features of the present disclosure will become more apparent with the following detailed description in conjunction with the accompanying drawings.

DETAILED DESCRIPTION OF EMBODIMENTS

Figure 1:
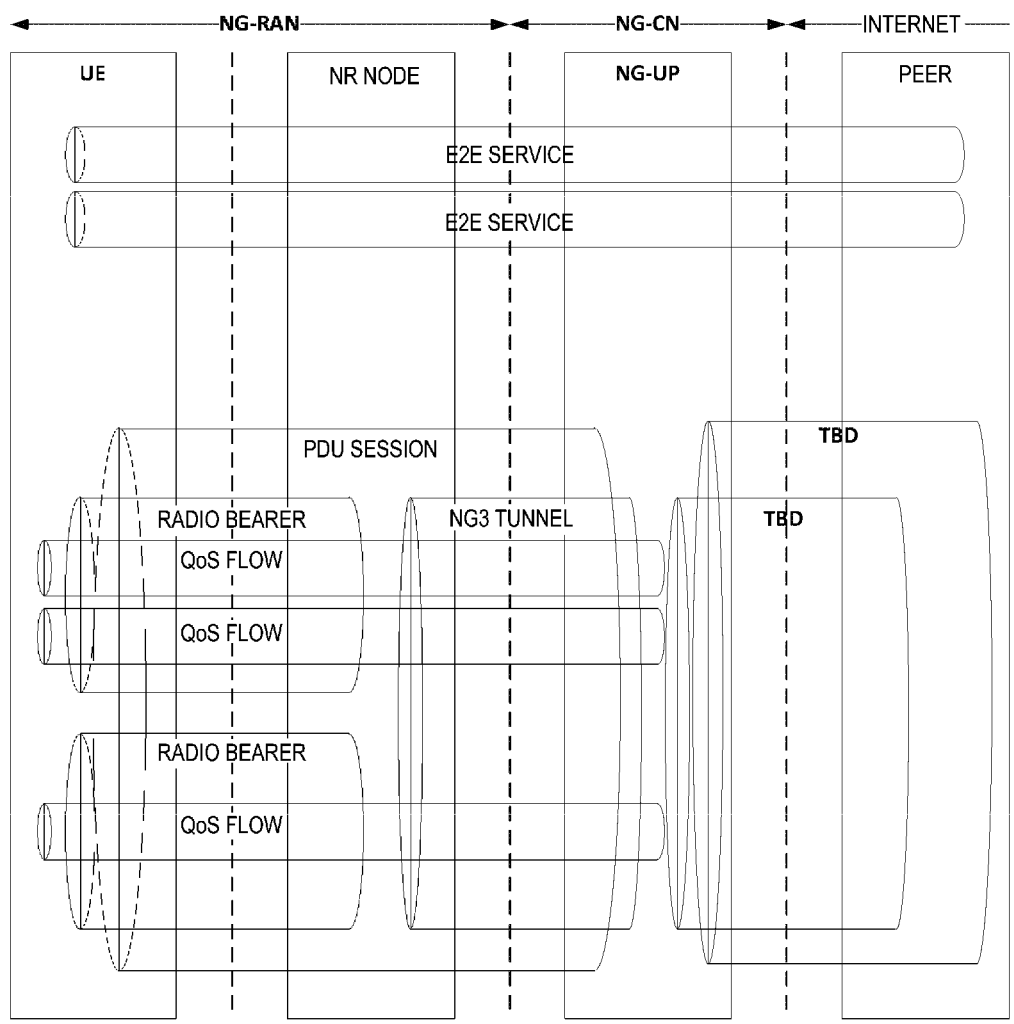
FIG. 1 shows a schematic NR QoS architecture according to the present disclosure that can be applied.

The following describes the present application in detail with reference to the accompanying drawings and specific embodiments. It should be noted that the present application should not be limited to the specific embodiments described below. In addition, for simplicity, detailed description of the known art not directly related to the present application is omitted to prevent confusion in understanding the present application.

Some terms involved in the present disclosure are described below. If not specifically indicated, the terms involved in the present disclosure use the definitions herein. The terms or information elements given in the present disclosure may be named differently in NR, LTE, and eLTE, but unified terms or information elements are used in the present disclosure. When applied to a specific system, the terms or information elements may be replaced with terms or information elements used in the corresponding system, and values of the information elements are those specified in the corresponding system. In the present disclosure, a base station may be any type of base station, including a Node B and an enhanced base station (eNB), or may be a 5G communications system base station (gNB) or a micro base station, a pica base station, a macro base station, a home base station, or the like; the cell may also be a cell under any of the aforementioned types of base stations. The cell and the base station can be replaced with each other in the present disclosure. In the present disclosure, PDCP may represent an NR PDCP entity or an LTE or eLTE PDCP entity; RLC may represent an NR RLC entity or an LTE or eLTE RLC entity. Similar to those in LTE, RLC UM (Unacknowledge Mode) is an unacknowledge mode, and RLC AM (Acknowledge mode) is an acknowledge mode.

The content of the present disclosure may be applied to a system connected to a 5G core network, such as an NR system and an eLTE system, or may be applied to subsequent evolved communications systems. The eLTE system refers to a system having LTE studied of subsequent versions connected to a 5G core network (next-generation core network) system.

The following are some concepts involved in the present disclosure.

QoS flow: also referred to as a 5G QoS flow, which is the minimum granularity for QoS forwarding treatment in a 5G system. All traffic mapped to the same 5G QoS flow receives the same forwarding treatment (for example, scheduling policy, queue management policy, rate shaping policy, or RLC configuration). Providing different QoS forwarding treatment requires different QoS flows.

PDU (Protocol Data Unit): a unit for processing data in a protocol layer.

PDU session: an association between UE and a data network for providing a PDU connection service. Such an association may be of a type of IP, Ethernet, or unstructured network.

PDU connection service: a service providing PDU exchange between UE and a data network.

Master base station (Master eNB, denoted as MeNB (a base station corresponding to E-UTRAN or LTE or eLTE) or MgNB (a base station corresponding to 5G-RAN or NR)): a base station that at least terminates at a mobility management entity (denoted as S1-MME) as a control node for processing interaction between UE and a core network in multiple connectivity. In the present invention, master base stations are all denoted as MeNBs. It should be noted that all schemes or definitions applicable to the MeNB are also applicable to the MgNB.

Secondary base station (Secondary eNB, denoted as SeNB (a base station corresponding to E-UTRAN or LTE or eLTE) or SgNB (a base station corresponding to 5G-RAN or NR)): a base station that does not serve as an MeNB and provides additional radio resources to UE in multiple connectivity. In the present invention, secondary base stations are all denoted as SeNBs. It should be noted that all schemes or definitions applicable to the SeNB are also applicable to the SgNB.

Primary cell (PCell): a cell that operates at a primary frequency, on which UE performs an initial connection establishment procedure or initiates a connection reestablishment procedure or which is designated as a primary cell during a handover procedure.

Secondary cell (SCell): a cell that operates at a secondary frequency. The cell can be configured after an RRC connection is established and can be used for providing additional radio resources.

Master cell group (MCG): for UE not configured with multiple connectivity, the MCG consists of all serving cells; for UE configured with multiple connectivity, the MCG consists of a subset of serving cells (namely, a group of serving cells associated with an MeNB or MgNB) including a PCell and 0, 1, or a plurality of SCells.

Secondary cell group (SCG): a group of serving cells associated with an SeNB or an SgNB in multiple connectivity. The SCG may include one PSCell, and may further include one or a plurality of SCells.

Multiple connectivity: an operation mode of UE in an RRC connected state. In the multiple connectivity, a plurality of cell groups are configured, and the plurality of cell groups include one MCG and one or a plurality of SCGs (namely, the UE is connected to a plurality of base stations). If only one MCG (or MeNB or MgNB) and one SCG (or SeNB or SgNB) are configured, the multiple connectivity is referred to as dual connectivity. That is, the UE in the connected state and having a plurality of receivers and/or transmitters is configured to use EUTRAN and/or 5G-RAN radio resources provided by a plurality of different schedulers; the schedulers may be connected by non-ideal backhaul or ideal backhaul. The multiple connectivity in the present disclosure includes dual connectivity. A multiple connectivity data transmission mode includes, but is not limited to, data duplication and link selection.

As described in the Background section, referring to FIG. 1, a core network establishes one or a plurality of PDU sessions for a UE in an NR QoS architecture. Further, a RAN establishes one or a plurality of DRBs for each PDU session of a UE. A packet filter of a NAS layer (non access stratum) associates uplink or downlink data packets with a corresponding QoS flow to implement mapping of the data packets to the QoS flow; the RAN maps data packets of different QoS flows or data packets from different PDU sessions to different DRBs, referring to FIG. 2. When PDU sessions are established, the RAN establishes at least one default DRB for a PDU session; or for a piece of UE, when a PDU session is established in a cell group or a serving base station, the RAN establishes a default DRB in the cell group or the serving base station for the PDU session.

Two main approaches exist for mapping an uplink QoS flow to a DRB:

Reflective mapping: For each DRB, downlink data packets carry QoS flow IDs, UE monitors the QoS flow IDs of the downlink data packets, and applies the same mapping to uplink data packets of the same PDU session and QoS flow ID, namely, maps the uplink data packets to the same DRB.

Explicit configuration: The RAN configures, through RRC signaling, mapping of a corresponding uplink QoS flow ID to a DRB. The UE maps an uplink data packet to a corresponding DRB according to the configuration.

If an incoming uplink data packet neither conforms to mapping of a QoS flow ID to a DRB that is configured by RRC nor conforms to reflective mapping of a QoS flow ID to a DRB, the UE maps the data packet to a default DRB of the PDU session.

When DC is not configured, one PDU session may correspond to one default DRB. When dual connectivity is configured, if one PDU session is associated with only one serving station or cell group (for example, a master cell group (MCG) (or referred to as a master base station, for example, an MeNB/MgNB, or a master station (Master Node), or a master network); or a secondary cell group (SCG) (or referred to as a secondary base station, for example, an SeNB/SgNB, or a secondary station (Secondary Node), or a secondary network)), one default DRB corresponding to the PDU session is also associated with a corresponding serving station or cell group. If one PDU session is associated with two serving stations or cell groups, preferably, one default DRB is established for the PDU session in each serving station or cell group; that is to say, if the same or different QoS flows of one PDU session are transmitted in an MCG and an SCG, the RAN establishes one default DRB for the PDU session in the MCG and also establishes one default DRB for the PDU session in the SCG. In this way, it may also be considered that in the case of more than two serving stations, one PDU session corresponds to a plurality of default DRBs; that is, one PDU session is associated with one default DRB in one serving station or one serving cell group consisting of serving cells under the serving station. For a piece of UE, when a PDU session is established in a cell group or a serving base station, the RAN establishes a default DRB in the cell group or the serving base station for the PDU session. Alternatively, if one PDU session is associated with two serving stations or cell groups, one default DRB is established for the PDU session in only one serving station or cell group. For example, one default DRB is established for the PDU session only in an MCG, while one default DRB is not established for the PDU session in an SCG; or one default DRB is established for the PDU session only in the SCG, while one default DRB is not established for the PDU session in the MCG. In this way, it may also be considered that in the case of more than two serving stations, one default DRB is established for one PDU session in only one serving station or cell group.

Figure 2:
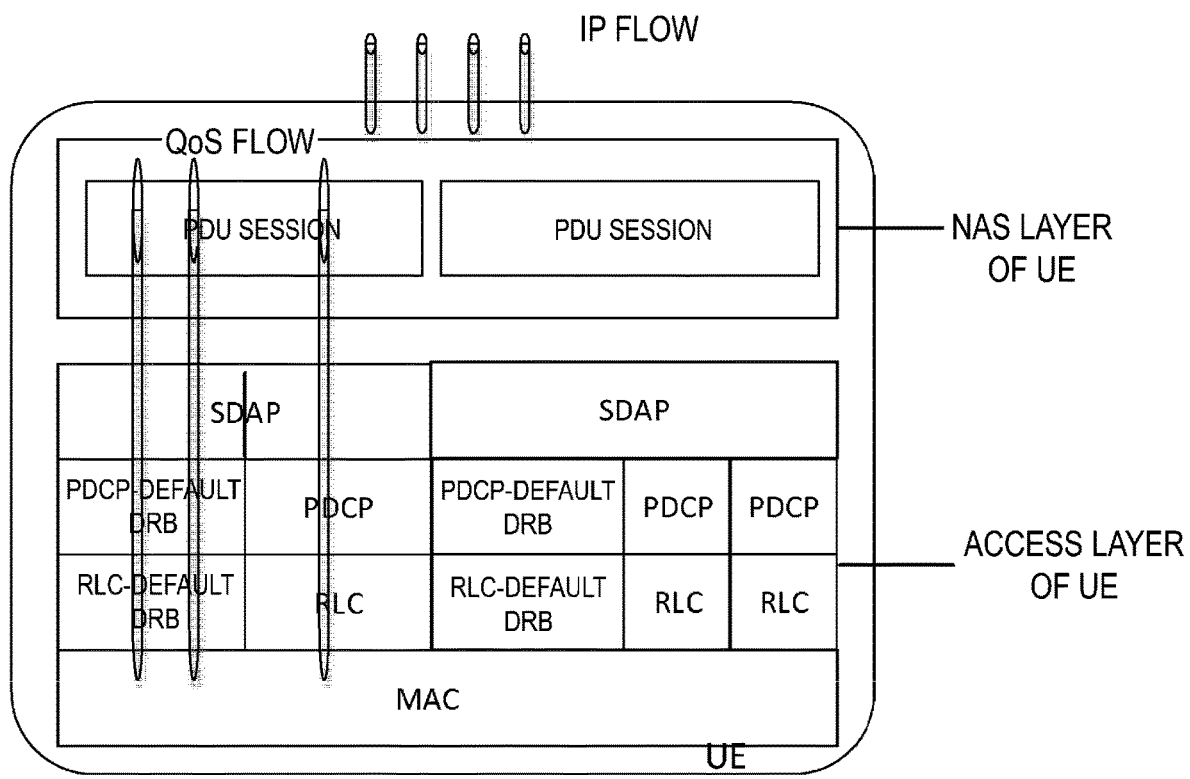
FIG. 2 is a schematic diagram illustrating mapping of data packets of different QoS flows or data packets from different PDU sessions to different DRBs.

In the present disclosure, an SDAP entity is used for supporting all functions of a QoS flow-based QoS architecture in a 5G system in an AS layer (access stratum), namely, capable of performing corresponding operations, including mapping between a DRB and a QoS flow and indicating a QoS flow ID for an uplink and/or downlink data packet; the functions may further include other functions required for the QoS flow-based QoS architecture in the AS layer, for example, reordering or in-sequence delivery. The entity may also have other names. The description of SDAP in a protocol stack is shown in FIG. 2. An SDAP configuration includes a corresponding configuration for supporting functions of an SDAP layer. The configuration may include any one or a plurality of items of the following: QoS mapping rules (for example, mapping rules between DRBs and QoS flows, mapping rules between DRBs and SDAP, mapping rules between QoS flows and SDAP, or mapping rules between DRBs and PDU sessions), an SDAP identifier, a protocol data unit session identifier (PDU session identity/identifier) associated with an SDAP entity, a reflective QoS configuration (for example, reflective mapping enabling or disabling), a QoS flow identifier for an uplink and/or downlink data packet, an indicator about whether it is needed to include a QoS flow identifier for an uplink and/or downlink data packet, and the like. The configuration may be a configuration acquired through an RRC message, or may be a configuration acquired in other manners, for example, a reflective QoS mechanism configuration obtained through information in a user plane data packet in a reflective QoS mechanism.

When dual connectivity (DC) (also referred to as multiple connectivity (MC)) is not configured, one PDU session may correspond to one SDAP entity; when DC is configured, the same or different QoS flows of one PDU session may be transmitted on both an MCG (or referred to as a master base station, for example, an MeNB/MgNB, or a master station (Master Node), or a master network) and an SCG (or referred to as a secondary base station, for example, an SeNB/SgNB, or a secondary station (Secondary Node), or a secondary network); in this case, one PDU session corresponds to two SDAP entities, one corresponding to the MCG, and one corresponding to the SCG. In this way, it may also be considered that in the case of more than two serving stations, one PDU session corresponds to a plurality of SDAP entities, each SDAP entity corresponding to one serving station or one serving cell group consisting of serving cells under the serving station. The present disclosure describes the cases where DC is not configured and DC is configured, but is also applicable to multiple connectivity scenarios of more than two serving stations.

Optionally, when a QoS flow identifier of a PDU session in an RRC configuration received by UE does not belong to a current UE configuration, and the QoS flow is the first QoS flow of the PDU session associated therewith, the UE establishes an SDAP entity according to an SDAP configuration (and/or a DRB configuration) in the RRC configuration. The above description may be for the case where DC is not configured, or may be for a cell group or serving station in the case of DC.

Optionally, when the RRC configuration received by the UE includes a default DRB identifier, and the default DRB identifier does not belong to the current UE configuration, the UE establishes an SDAP entity according to the SDAP configuration (and/or the DRB configuration) in the RRC configuration. The above description may be for the case where DC is not configured, or may be for a cell group or serving station in the case of DC.

Optionally, when the RRC configuration received by the UE includes a DRB identifier, and the DRB identifier is the first DRB associated with a PDU session or SDAP associated therewith, the UE establishes an SDAP entity according to the SDAP configuration (and/or the DRB configuration) in the RRC configuration. The above description may be for the case where DC is not configured, or may be for a cell group or serving station in the case of DC.

Optionally, when the RRC configuration received by the UE includes an SDAP identifier, and the SDAP identifier does not belong to the current UE configuration, the UE establishes an SDAP entity according to the SDAP configuration (and/or the DRB configuration) in the RRC configuration. The above description may be for the case where DC is not configured, or may be for a cell group or serving station in the case of DC.

A method performed at UE for delivering a data packet according to an exemplary embodiment of the present disclosure will be described below with reference to FIG. 3.

Figure 3:
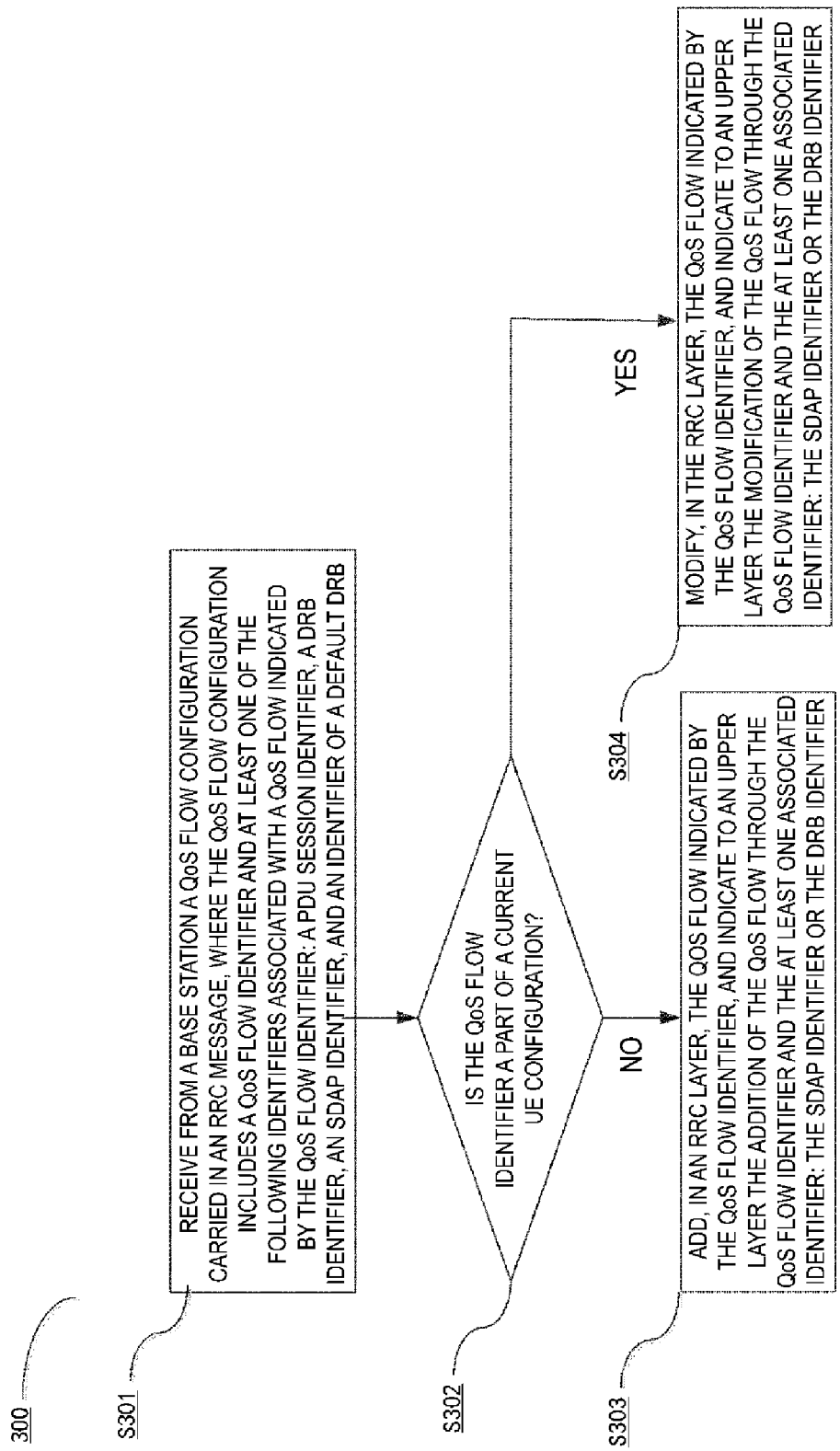
FIG. 3 schematically shows a flowchart of a method performed at UE for delivering a data packet according to an exemplary embodiment of the present disclosure.

FIG. 3 schematically shows a flowchart of a method 300 performed at UE for delivering a data packet according to an exemplary embodiment of the present disclosure. As shown in FIG. 3, the method 300 may include steps S301, S302, S303, and S304.

In step S301, the UE may receive from a base station a quality of service (QoS) flow configuration contained in an RRC message, where the QoS flow configuration includes a QoS flow identifier and at least one of the following identifiers:

a protocol data unit (PDU) session identifier associated with a QoS flow indicated by the QoS flow identifier, a data radio bearer (DRB) identifier associated with the QoS flow indicated by the QoS flow identifier, a Service Data Adaptation Protocol (SDAP) identifier associated with the QoS flow indicated by the QoS flow identifier, and an identifier of a default DRB associated with the QoS flow indicated by the QoS flow identifier.

Alternatively, the QoS flow configuration may further include an identifier of a default DRB associated with a DRB indicated by the DRB identifier and/or a PDU session identifier associated with the DRB indicated by the DRB identifier.

Specifically, the QoS flow configuration may be included in an RRC connection reconfiguration message, an RRC connection setup message, an RRC connection reestablishment message, or an RRC connection resume message. More specifically, the QoS flow configuration may be included in a radio configuration contained in the RRC message, for example, an SDAP configuration or a DRB configuration (for example, a DRB addition/modification list).

In step S302, the UE may determine whether the QoS flow identifier is a part of a current UE configuration.

If the QoS flow identifier is not a part of the current UE configuration, the process proceeds to step S303 in which the UE may add (or referred to as "establish," where the two terms can be used interchangeably herein), in an RRC layer (a part of an AS layer), the QoS flow indicated by the QoS flow identifier, and indicate to an upper layer (for example, a NAS layer) the addition of the QoS flow through the QoS flow identifier and the at least one associated identifier.

If the QoS flow identifier is not a part of the current UE configuration, the process proceeds to step S304 in which the UE may modify, in the RRC layer, the QoS flow indicated by the QoS flow identifier, and indicate to the upper layer the modification of the QoS flow through the QoS flow identifier and the at least one associated identifier that are received.

The modification of the QoS flow may include: modifying an identifier in the current UE configuration associated with the QoS flow and corresponding to the at least one identifier to the at least one identifier that is received and associated with the QoS flow identifier.

Optionally, the method 300 may further include the following step: further mapping, according to a mapping rule between the QoS flow identifier and the at least one associated identifier, a data packet mapped to the QoS flow identifier to an SDAP entity corresponding to the at least one identifier.

In one example, when addition or modification of a QoS flow is performed, the NAS of the UE may acquire, from the AS, a mapping rule between an identifier of the QoS flow and an associated SDAP identifier. When an uplink data packet arrives, the NAS first maps the uplink data packet to a corresponding QoS flow identifier, and then maps, through a mapping rule between the QoS flow identifier and an associated SDAP identifier, the uplink data packet associated with the QoS flow identifier to a corresponding SDAP, that is, delivers the uplink data packet with the QoS flow identifier to an SDAP entity indicated by the SDAP identifier associated with the QoS flow identifier, so that the SDAP entity can deliver, according to the aforementioned RRC configured mapping or reflective mapping or default DRB mapping, the data packet to a corresponding DRB for transmission.

In another example, when addition or modification of a QoS flow is performed, the NAS of the UE may acquire, from the AS, a mapping rule between an identifier of the QoS flow and an associated DRB identifier. When an uplink data packet arrives, the NAS first maps the uplink data packet to a corresponding QoS flow identifier, and then indicates, through a mapping rule between the QoS flow identifier and an associated DRB identifier, the uplink data packet associated with the QoS flow identifier and the corresponding DRB identifier and the QoS flow identifier to an SDAP layer. The SDAP layer may deliver the uplink data packet to a correct SDAP entity according to a mapping rule between the SDAP entity and the DRB identifier, so that the SDAP entity can deliver, according to the aforementioned RRC configured mapping or reflective mapping or default DRB mapping, the data packet to a corresponding DRB for transmission.

In another example, when addition or modification of a QoS flow is performed, the NAS of the UE may acquire, from the AS, a mapping rule between an identifier of the QoS flow and an associated PDU session identifier. When an uplink data packet arrives, the NAS first maps the uplink data packet to a corresponding QoS flow identifier, and then indicates, through a mapping rule between the QoS flow identifier and an associated PDU session identifier, the uplink data packet associated with the QoS flow identifier and the corresponding PDU session identifier and the QoS flow identifier to an SDAP layer. The SDAP layer may deliver the uplink data packet to a correct SDAP entity according to a mapping rule between the SDAP entity and the PDU session identifier, so that the SDAP entity can deliver, according to the aforementioned RRC configured mapping or reflective mapping or default DRB mapping, the data packet to a corresponding DRB for transmission.

By means of the aforementioned method, the NAS layer of the UE can obtain a mapping relationship between a QoS flow of a PDU session and an SDAP entity or a default DRB or a DRB, so as to finally deliver uplink data packets from one PDU session to a correct DRB for transmission.

The following will describe the method 300 in detail in Embodiments 1 and 2 respectively by using an example in which a QoS flow configuration includes at least a QoS flow identifier and an SDAP identifier associated with a QoS flow indicated by the QoS flow identifier, or a QoS flow configuration includes at least a QoS flow identifier and a DRB identifier associated with a QoS flow indicated by the QoS flow identifier.

Embodiment 1

In this embodiment, a received QoS flow configuration includes at least a QoS flow identifier and an SDAP identifier associated with a QoS flow indicated by the QoS flow identifier.

In step S301, UE may receive from a base station a QoS flow configuration contained in an RRC message, where the QoS flow configuration includes at least a QoS flow identifier and an SDAP identifier associated with a QoS flow indicated by the QoS flow identifier.

Alternatively, the QoS flow configuration may further include at least one of the following identifiers:

a PDU session identifier associated with the QoS flow indicated by the QoS flow identifier, a DRB identifier associated with the QoS flow indicated by the QoS flow identifier, an identifier of a default DRB associated with the QoS flow indicated by the QoS flow identifier, an identifier of a default DRB associated with a DRB indicated by the DRB identifier, and a PDU session identifier associated with the DRB indicated by the DRB identifier.

The QoS flow configuration may be included in an RRC connection reconfiguration message, an RRC connection setup message, an RRC connection reestablishment message, or an RRC connection resume message. More specifically, the QoS flow configuration may be included in a radio configuration contained in the RRC message, for example, an SDAP configuration or a DRB configuration (for example, a DRB addition/modification list).

In step S302, the UE may determine whether the QoS flow identifier is a part of a current UP configuration.

If the QoS flow identifier is not a part of the current UE configuration, the process proceeds to step S303 in which the UE may perform addition of the QoS flow (or referred to as establishment of the QoS flow, where the two terms can be used interchangeably herein) indicated by the QoS flow ID in an RRC layer, and indicate to an upper layer (for example, a NAS layer) the addition of the QoS flow, where the addition of the QoS flow is indicated by the QoS flow identifier and the associated SDAP identifier.

Considering the case where an SDAP entity and the QoS flow are synchronously established, step S303 may also be described as follows: when an SDAP identifier is included in an RRC configuration (for example, an SDAP configuration) and is not a part of the current UP configuration, the RRC of the UE indicates the establishment of the SDAP to the upper layer (for example, the NAS layer), where the modification of the SDAP is indicated by the SDAP identifier and one or a plurality of associated QoS flow identifiers.

Considering DC, another description of step S303 may be as follows: when a QoS flow identifier is included in an SCG configuration (or an SDAP configuration in the SCG configuration, or a DRB configuration of an SCG) and is not a part of the current UE configuration, the RRC of the UE indicates the establishment of the QoS flow to the upper layer (for example, the NAS layer), where the establishment of the QoS flow is indicated by the QoS flow identifier and an associated SDAP identifier. Or, when a QoS flow identifier is included in an MCG configuration (or an SDAP configuration in the MCG configuration, or a DRB configuration of an MCG) and is not a part of the current UE configuration, the RRC of the UE indicates the establishment of the QoS flow to the upper layer (for example, the NAS layer), where the establishment of the QoS flow is indicated by the QoS flow identifier and an associated SDAP identifier. Optionally, the current UE configuration includes the MCG configuration and the SCG configuration, or includes only the MCG configuration, or includes only the SCG configuration.

If the QoS flow identifier is a part of the current UP configuration, the process proceeds to step S304 in which the UE may modify, in the RRC layer, the QoS flow indicated by the QoS flow identifier, and indicate to the upper layer (for example, the NAS layer) the modification of the QoS flow, where the modification of the QoS flow is indicated by the QoS flow identifier and the associated SDAP identifier.

The modification of the QoS flow may include modifying an SDAP entity associated with the QoS flow, specifically, modifying an SDAP identifier in the current UE configuration associated with the QoS flow to the received SDAP identifier that is associated with the QoS flow identifier. For example, when DC is configured, a QoS flow transmitted through the MCG is remapped to the SCG so that the QoS flow is transmitted through the SCG after modification; in this process, the SDAP entity associated with the QoS flow is changed from an SDAP entity corresponding to the MCG to an SDAP entity corresponding to the SCG. Otherwise, a QoS flow transmitted through the SCG may also be remapped to the MCG so that the QoS flow is transmitted through the MCG after modification; in this process, the SDAP entity associated with the QoS flow is changed from the SDAP entity corresponding to the SCG to the SDAP entity corresponding to the MCG.

Thus, another description of step S304 may be as follows: when an SDAP entity associated with a QoS flow identifier is changed or modified, the RRC of the UE indicates the modification of the QoS flow to the upper layer (for example, the NAS layer), where the modification of the QoS flow is indicated by the QoS flow identifier and an associated SDAP identifier. Or, step S304 may also be described as follows: when an SDAP identifier is included in an RRC configuration (for example, an SDAP configuration) and is a part of the current UE configuration, the RRC of the UE indicates the modification of the SDAP to the upper layer (for example, the NAS layer), where the modification of the SDAP is indicated by the SDAP identifier and one or a plurality of associated QoS flow identifiers.

From the perspective of information element design, a further description of step S304 may be as follows: when a QoS flow identifier is included in an SCG configuration (or an SDAP configuration in the SCG configuration, or a DRB configuration of an SCG) and is a part of an MCG configuration (or an SDAP configuration of an MCG, or a DRB configuration of the MCG) of the UE, the RRC of the UE indicates the modification of the QoS flow to the upper layer (for example, the NAS layer), where the modification of the QoS flow is indicated by the QoS flow identifier and an associated SDAP identifier. Or, when a QoS flow identifier is included in an MCG configuration (or an SDAP configuration in the MCG configuration, or a DRB configuration of an MCG) and is a part of an SCG configuration (or an SDAP configuration of an SCG, or a DRB configuration of the SCG) of the UE, the RRC of the UE indicates the modification of the QoS flow to the upper layer (for example, the NAS layer), where the modification of the QoS flow is indicated by the QoS flow identifier and an associated SDAP identifier, In this embodiment, preferably, the QoS flow identifier may be unique in one PDU session; that is, QoS flow identifiers of different QoS flows belonging to different PDU sessions may be duplicate. Optionally, the QoS flow identifier may also be unique among PDU sessions; that is, QoS flow identifiers of different QoS flows belonging to different PDU sessions are different. Based on the above considerations, optionally, when the QoS flow identifier is unique in one PDU session, the QoS flow identifier in this embodiment may be replaced with the QoS flow identifier and a corresponding PDU session identifier. The PDU session identifier is used for uniquely identifying one PDU session, Optionally, the aforementioned SDAP identifier may be replaced with a default DRB identifier. As previously described, a case exists in which one default DRB is configured for one PDU session in one SDAP entity, and in the case of DC, an MCG and an SCG respectively correspond to different SDAP entities, where one default DRB is configured for an associated PDU session in each SDAP entity. Thus, an identifier of a default DRB can uniquely identify one SDAP entity on one piece of UE; in this case, the SDAP entity and the default DRB identifier are equivalent.

Optionally, the method 300 may further include the following step: further mapping, according to a mapping rule between the QoS flow identifier and the associated SDAP identifier, a data packet mapped to the QoS flow identifier to an SDAP entity indicated by the SDAP identifier, so that the SDAP entity can deliver, according to the aforementioned RRC configured mapping or reflective mapping or default DRB mapping, the data packet to a corresponding DRB for transmission.

Specifically, when addition or modification of a QoS flow is performed, the NAS of the UE acquires, from the AS, a mapping rule between an identifier of the QoS flow and an associated SDAP identifier. When an uplink data packet arrives, the NAS first maps the uplink data packet to a corresponding QoS flow identifier, and then maps, through a mapping rule between the QoS flow identifier and an associated SDAP identifier, the uplink data packet associated with the QoS flow identifier to a corresponding SDAP, namely, delivers the uplink data packet with the QoS flow identifier to an SDAP entity indicated by the SDAP identifier associated with the QoS flow identifier, so that the SDAP entity can deliver, according to the aforementioned RRC configured mapping or reflective mapping or default DRB mapping, the data packet to a corresponding DRB for transmission.

Optionally, the method 300 may further include the following step: performing addition or modification of the SDAP entity according to the received SDAP configuration.

Embodiment 2

In this embodiment, a received QoS flow configuration includes at least a QoS flow identifier and a DRB identifier associated with a QoS flow indicated by the QoS flow identifier.

In step S301, UE may receive from a base station a QoS flow configuration contained in an RRC message, where the QoS flow configuration includes at least a QoS flow identifier and a DRB identifier associated with a QoS flow indicated by the QoS flow identifier.

Alternatively, the QoS flow configuration may further include at east one of the following identifiers:

a PDU session identifier associated with the QoS flow indicated by the QoS flow identifier, an SDAP identifier associated with the QoS flow indicated by the QoS flow identifier, an identifier of a default DRB associated with the QoS flow indicated by the QoS flow identifier.

an identifier of a default DRB associated with a DRB indicated by the DRB identifier, and a PDU session identifier associated with the DRB indicated by the DRB identifier.

The QoS flow configuration may be included in an RRC connection reconfiguration message, an RRC connection setup message, an RRC connection reestablishment message, or an RRC connection resume message. More specifically, the QoS flow configuration may be included in a radio configuration contained in the RRC message, for example, an SDAP configuration or a DRB configuration (for example, a DRB addition/modification list).

In step S302, the UE may determine whether the QoS flow identifier is a part of a current UE configuration.

If the QoS flow identifier is not a part of the current UE configuration, the process proceeds to step S303 in which the UE may perform addition of the QoS flow indicated by the QoS flow ID in an RRC layer, and indicate to an upper layer (for example, a NAS layer) the addition of the QoS flow, where the addition of the QoS flow is indicated by the QoS flow identifier and the associated DRB identifier.

Considering DC, another description of step 303 may be as follows: when a QoS flow identifier is included in an SCG configuration (or an SDAP configuration in the SCG configuration, or a DRB configuration of an SCG) and is not a part of the current UE configuration, the RRC of the UE indicates the establishment of the QoS flow to the upper layer (for example, the NAS layer), where the establishment of the QoS flow is indicated by the QoS flow identifier and an associated DRB identifier. Or, when a QoS flow identifier is included in an MCG configuration (or an SDAP configuration in the MCG configuration, or a DRB configuration of an MCG) and is not a part of the current UE configuration, the RRC of the UE indicates the establishment of the QoS flow to the upper layer (for example, the NAS layer), where the establishment of the QoS flow is indicated by the QoS flow identifier and an associated DRB identifier. Optionally, the current UE configuration includes the MCG configuration and the SCG configuration, or includes only the MCG configuration, or includes only the SCG configuration.

Considering the case where the QoS flow and a DRB are synchronously established, a further description of step 303 may be as follows: when a DRB is added (that is, a DRB identifier is included in a DRB configuration (for example, a DRB addition/modification configuration) and is not a part of the current UE configuration), the RRC of the UE indicates the establishment of the DRB to the upper layer (for example, the NAS layer), where the establishment of the DRB is indicated by the DRB identifier and one or a plurality of associated QoS flow identifiers.

If the QoS flow identifier is a part of the current UE configuration, the process proceeds to step S304 in which the UE may modify the QoS flow indicated by the QoS flow identifier in the RRC layer, and indicate to the upper layer (for example, the NAS layer) the modification of the QoS flow, where the modification of the QoS flow is indicated by the QoS flow identifier and the associated DRB identifier.

The modification of the QoS flow may include modifying a DRB identifier associated with the QoS flow, specifically, modifying a DRB identifier in the current UE configuration associated with the QoS flow to the received DRB identifier that is associated with the QoS flow identifier. For example, when DC is configured, a QoS flow transmitted through the MCG is remapped to the SCG so that the QoS flow is transmitted through the SCG after modification; in this process, the DRB associated with the QoS flow is changed from a DRB corresponding to the MCG to a DRB corresponding to the SCG. Otherwise, a QoS flow transmitted through the SCG may also be remapped to the MCG so that the QoS flow is transmitted through the MCG after modification; in this process, the DRB associated with the QoS flow is changed from the DRB corresponding to the SCG to the DRB corresponding to the MCG.

Thus, another description of step S304 may be as follows: when a DRB associated with a QoS flow identifier is changed or modified, the RRC of the UE indicates the modification of the QoS flow to the upper layer (for example, the NAS layer), where the modification of the QoS flow is indicated by the QoS flow identifier and an associated DRB identifier.

From the perspective of information element design, a further description of step S304 may be as follows: when a QoS flow identifier is included in an SCG configuration (or an SDAP configuration in the SCG configuration, or a DRB configuration of an SCG) and is a part of an MCG configuration (or an SDAP configuration of an MCG, or a DRB configuration of the MCG) of the UE, the RRC of the UE indicates the modification of the QoS flow to the upper layer (for example, the NAS layer), where the modification of the QoS flow is indicated by the QoS flow identifier and an associated DRB identifier. Or, when a QoS flow identifier is included in an MCG configuration (or an SDAP configuration in the MCG configuration, or a DRB configuration of the MCG) and is a part of an SCG configuration (or an SDAP configuration of an SCG, or a DRB configuration of the SCG) of the UE, the RRC of the UE indicates the modification of the QoS flow to the upper layer (for example, the NAS layer), where the modification of the QoS flow is indicated by the QoS flow identifier and an associated DRB identifier.

Considering the case where the QoS flow and a DRB are not synchronously established, a further description of step S304 may be as follows: when a DRB is modified (that is, a DRB identifier is included in a DRB configuration (for example, a DRB addition/modification configuration) and is a part of the current UE configuration), the RRC of the UE indicates the modification of the DRB to the upper layer (for example, the NAS layer), where the modification of the DRB is indicated by the DRB identifier and one or a plurality of associated QoS flow identifiers.

In this embodiment, preferably, the QoS flow identifier may be unique in one PDU session; that is, QoS flow identifiers of different QoS flows belonging to different PDU sessions may be duplicate. Optionally, the QoS flow identifier may also be unique among PDU sessions; that is, QoS flow identifiers of different QoS flows belonging to different PDU sessions are different. Based on the above considerations, optionally, when the QoS flow identifier is unique in one PDU session, the QoS flow identifier in this embodiment may be replaced with the QoS flow identifier and a corresponding PDU session identifier. The PDU session identifier is used for uniquely identifying one PDU session.

Optionally, the method 300 may further include the following step: further mapping, according to a mapping rule between the QoS flow identifier and the associated DRB identifier, a data packet mapped to the QoS flow identifier to an SDAP entity corresponding to the DRB identifier (namely, finding the corresponding SDAP entity according to the DRB identifier), so that the SDAP entity can deliver, according to the aforementioned RRC configured mapping or reflective mapping or default DRB mapping, the data packet to a corresponding DRB for transmission. Since each SDAP entity corresponds to a different DRB identifier, for example, an SDAP entity 1 corresponds to a DRB 1/2 and an SDAP entity 2 corresponds to a DRB 3/4, if one QoS flow is associated with the DRB 3, after the NAS layer delivers data to the SDAP layer, the SDAP layer knows, according to a mapping rule between a QoS flow identifier and an associated DRB identifier, that the data is associated with the DRB 3, and the DRB 3 corresponds to the SDAP entity 2; thus, the SDAP layer will deliver the data to the SDAP entity 2, which then maps the data to the DRB 3.

Specifically, when addition or modification of a QoS flow is performed, the NAS of the UE acquires, from the AS, a mapping rule between an identifier of the QoS flow and a DRB identifier. When an uplink data packet arrives, the NAS first maps the uplink data packet to a corresponding QoS flow identifier, and then indicates, through a mapping rule between the QoS flow identifier and a DRB identifier, the uplink data packet associated with the QoS flow identifier and the corresponding DRB identifier and the QoS flow identifier to an SDAP layer. The SDAP layer may deliver the uplink data packet to a correct SDAP entity according to a mapping rule between an SDAP entity and a DRB identifier. In this way, the SDAP entity can deliver, according to the aforementioned RRC configured mapping or reflective mapping or default DRB mapping, the data packet to a corresponding DRB for transmission.

The present disclosure further provides a method for learning a default DRB performed at UE.

In one embodiment, which DRB is a default DRB is implicitly configured, and the UE or a base station considers that the first DRB associated with a PDU session is the default DRB, where the first DRB refers to the first DRB associated/configured/established for the PDU session. Optionally, when dual connectivity (DC) (also referred to as multiple connectivity) is configured, in a serving station or cell group (for example, a master cell group (MCG) (or referred to as a master base station, for example, an MeNB/MgNB, or a master station (Master Node), or a master network); or a secondary cell group (SCG) (or referred to as a secondary base station, for example, an SeNB/SgNB, or a secondary station (Secondary Node), or a secondary network)), the UE or the base station considers that the first DRB associated with a PDU session is a default DRB, where the first DRB refers to the first DRB associated/configured for the PDU session in the serving station or cell group.

In another embodiment, which DRB is a default DRB is implicitly learned, and the UE or the base station considers that a DRB having the smallest DRB identifier value among DRBs associated with a PDU session is the default DRB. Optionally, when dual connectivity (DC) (also referred to as multiple connectivity) is configured, in a serving station or cell group (for example, a master cell group (MCG) (or referred to as a master base station, for example, an MeNB/MgNB, or a master station (Master Node), or a master network); or a secondary cell group (SCG) (or referred to as a secondary base station, for example, an SeNB/SgNB, or a secondary station (Secondary Node), or a secondary network)), the UE or the base station considers that a DRB having the smallest DRB identifier value associated with a PDU session is a default DRB, where the DRB having the smallest DRB identifier value refers to a DRB having the smallest DRB identifier value that is associated/configured for the PDU session in the serving station or cell group.

The present disclosure further provides a method performed at UE for delivering an uplink data packet to a correct SDAP entity, which is applicable to non-DC scenarios.

In one embodiment, when a default DRB is established, RRC of the UE indicates the establishment of the default DRB to an upper layer (NAS). The indicating the establishment of the default DRB includes indicating a PDU session identifier associated with the default DRB and an SDAP identifier associated therewith. The "when a default DRB is established" may refer to when a DRB identifier is included in a DRB configuration and is not a part of a current UE configuration, and the DRB is a default DRB (or configured as a default DRB).

By means of this embodiment, the NAS of the UE can establish mapping rules between PDU sessions and SDAP entities so as to deliver uplink data packets from a PDU session to a correct SDAP entity according to the mapping rules. The SDAP entity can transmit the data packets through a correct DRB according to mapping rules between QoS flows and DRBs that are configured by the SDAP entity.

The present disclosure further provides a method for delivering a data packet while performing DRB release.

In this embodiment, UE performing DRB release includes performing the following one or plurality of operations on a DRB:

releasing a PDCP entity;

releasing (one or a plurality of) RLC entities;

releasing a DTCH logical channel; and indicating to an upper layer (for example, a NAS layer) the release of the DRB and a PDU session identifier associated therewith. The indicating to an upper layer the release of the DRB and a PDU session identifier associated therewith includes: if the process is triggered by a handover, indicating to the upper layer the release of the DRB and the PDU session identifier associated therewith after the handover succeeds; otherwise, immediately indicating to the upper layer the release of the DRB and the PDU session identifier associated therewith.

Optionally, for each DRB identifier included in a DRB release configuration (for example, a DRB release list) and being a part of a current UE configuration, the UE performs DRB release for the DRB.

Optionally, the PDU session identifier may also be a QoS flow identifier or an SDAP identifier or a default DRB identifier associated with the DRB.

By means of this embodiment, RRC of the UE notifies the NAS layer when a DRB is released, so that the NAS layer learns the availability of the DRB and thus decides whether to deliver a data packet to a lower layer.

The present disclosure further provides a method for delivering a data packet while performing SDAP entity release.

In this embodiment, when performing SDAP entity release, UE indicates the release of the SDAP to an upper layer (for example, a NAS layer). The release of the SDAP is indicated by an SDAP identifier and a PDU session identifier associated therewith. Optionally, the indicating to an upper layer the release of the SDAP and a PDU session identifier associated therewith includes: if the process is triggered by a handover, indicating to the upper layer the release of the SDAP and the PDU session identifier associated therewith after the handover succeeds; otherwise, immediately indicating to the upper layer the release of the SDAP and the PDU session identifier associated therewith.

Optionally, for each SDAP identifier included in an SDAP release configuration (for example, an SDAP release list) and being a part of a current UP configuration, the UE performs SDAP release for the SDAP. Optionally, if an SDAP identifier included in the SDAP release configuration is not the current UE configuration, the UE does not consider that an RRC message including the SDAP release configuration is incorrect.

Optionally, the PDU session identifier may also be a QoS flow identifier or a default DRB identifier associated with the SDAP.

Optionally, if all DRBs or all QoS flows associated with one SDAP entity are released, the SDAP entity is released.

By means of this embodiment, RRC of the UE notifies the NAS layer when an SDAP is released, so that the NAS layer learns the availability of the SDAP and thus decides whether to deliver a data packet to a lower layer.

The present disclosure further provides a method for delivering a data packet while performing QoS flow release.

In this embodiment, when performing QoS flow release, UE indicates the release of the QoS flow to an upper layer (for example, a NAS layer). The release of the QoS flow is indicated by a QoS flow identifier and/or a PDU session identifier associated therewith. Optionally, the indicating to an upper layer the release of the QoS flow and/or a PDU session identifier associated therewith includes: if the process is triggered by a handover, indicating to the upper layer the release of the QoS flow and/or the PDU session identifier associated therewith after the handover succeeds; otherwise, immediately indicating to the upper layer the release of the QoS flow and/or the PDU session identifier associated therewith.

Optionally, for each QoS flow identifier included in a QoS flow release configuration (for example, a QoS flow release list) and being a part of a current UE configuration, the UE performs QoS flow release for the QoS flow. Optionally, if a QoS flow identifier included in the QoS flow release configuration is not the current UE configuration, the UE does not consider that an RRC message including the QoS flow release configuration is incorrect.

Optionally, the PDU session identifier may also be an SDAP identifier or a default DRB identifier associated with the SDAP or the QoS flow.

By means of this embodiment, RRC of the UE notifies the NAS layer when a QoS flow is released, so that the NAS layer learns the availability of the QoS flow in a wireless network and thus decides whether to deliver a data packet to a lower layer.

Figure 4:
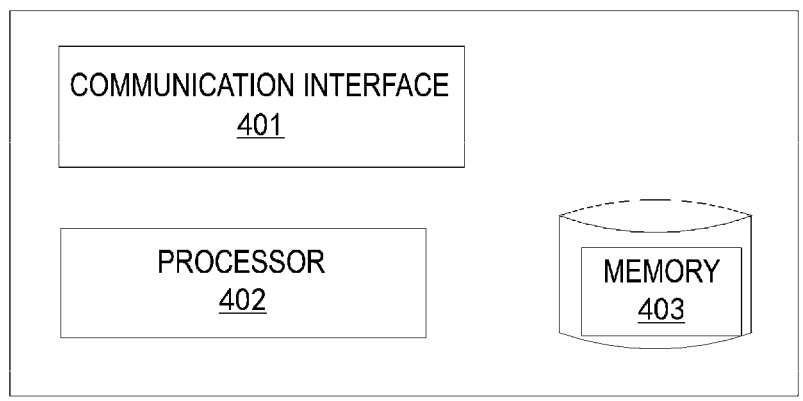
FIG. 4 schematically shows a structural block diagram of UE for performing a method for delivering a data packet according to an exemplary embodiment of the present invention.

The structure of UE according to an exemplary embodiment of the present invention will be described below with reference to FIG. 4. FIG. 4 schematically shows a structural block diagram of UE for performing a method for delivering a data packet according to an exemplary embodiment of the present invention. The UE 400 can be used for performing the method 300 described with reference to FIG. 3. For the sake of simplicity, only a schematic structure of the UE according to the exemplary embodiment of the present disclosure is described herein, and details already described in the method 300 as described above with reference to FIG. 3 are omitted.

As shown in FIG. 4, the UE 400 includes a communication interface 401 configured to perform external communication; a processing unit or a processor 402, where the processor 402 may be a single unit or a combination of a plurality of units configured to perform different steps of the method; and a memory 403 storing computer-executable instructions that, when executed by the processor 402, cause the processor 402 to perform the following process:

receiving from a base station a quality of service (QoS) flow configuration contained in a radio resource control (RRC) message, where the QoS flow configuration includes a QoS flow identifier and at least one of the following identifiers:

a PDU session identifier associated with a QoS flow indicated by the QoS flow identifier, a DRB identifier associated with the QoS flow indicated by the QoS flow identifier, an SDAP identifier associated with the QoS flow indicated by the QoS flow identifier, an identifier of a default DRB associated with the QoS flow indicated by the QoS flow identifier; determining whether the QoS flow identifier is a part of a current UE configuration; and if the QoS flow identifier is not a part of the current UE configuration, adding, in an RRC layer, the QoS flow indicated by the QoS flow identifier, and indicating to an upper layer the addition of the QoS flow through the QoS flow identifier and the at least one associated identifier;

if the QoS flow identifier is a part of the current UE configuration, modifying, in the RRC layer, the QoS flow indicated by the QoS flow identifier, and indicating to the upper layer the modification of the QoS flow through the QoS flow identifier and the at least one associated identifier that are received.

In one exemplary embodiment, when executed by the processor, the instructions further cause the processor to perform the following process:

further mapping, according to a mapping rule between the QoS flow identifier and the at least one associated identifier, a data packet mapped to the QoS flow identifier to an SDAP entity corresponding to the at least one identifier.

In one exemplary embodiment, the QoS flow configuration is included in an SDAP configuration or a DRB configuration.

In one exemplary embodiment, the modification of the QoS flow includes: modifying an identifier in the current UE configuration associated with the QoS flow and corresponding to the at least one identifier to the at least one identifier that is received and associated with the QoS flow identifier.

It can be understood that although not described here, the aforementioned other methods provided in the present disclosure may also be performed by UE 400.

A method performed at a base station for delivering a data packet according to an exemplary embodiment of the present disclosure will be described below with reference to FIG. 5.

Figure 5:
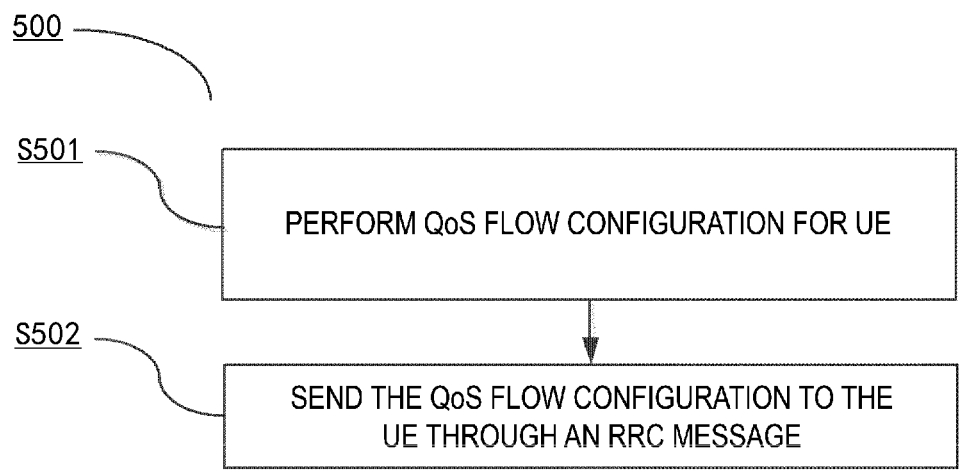
FIG. 5 schematically shows a flowchart of a method performed at a base station for delivering a data packet according to an exemplary embodiment of the present disclosure.

FIG. 5 schematically shows a flowchart of a method 500 performed at a base station for delivering a data packet according to an exemplary embodiment of the present disclosure. As shown in FIG. 5, the method 500 may include step S501 and step S502.

In step S501, the base station may perform a QoS flow configuration for UE, where the QoS flow configuration includes a QoS flow identifier and at least one of the following identifiers:

a PDU session identifier associated with a QoS flow indicated by the QoS flow identifier, a DRB identifier associated with the QoS flow indicated by the QoS flow identifier, an SDAP identifier associated with the QoS flow indicated by the QoS flow identifier, and an identifier of a default DRB associated with the QoS flow indicated by the QoS flow identifier.

Specifically, the base station may perform the QoS flow configuration for the UE according to QoS attributes of the QoS flow. The QoS attributes are QoS parameters, which may include packet delay requirements, packet loss rate requirements, quality classification indication requirements, a guaranteed bit rate, and the like.

In step S502, the base station may send the QoS flow configuration to the UE through an RRC message.

Optionally, the QoS flow configuration may be included in an RRC connection reconfiguration message, or an RRC connection setup message, or an RRC connection reestablishment message, or an RRC connection resume message. More specifically, the QoS flow configuration may be included in an SDAP configuration, or may be included in a DRB configuration (for example, a DRB addition modification list).

Optionally, the method 500 may further include: the base station receives, according to a mapping rule between the QoS flow identifier and the associated SDAP identifier or DRB identifier in the QoS flow configuration that is sent in step S502, a data packet on a DRB corresponding to an SDAP entity indicated by the SDAP identifier or a DRB indicated by the DRB identifier.

Figure 6:
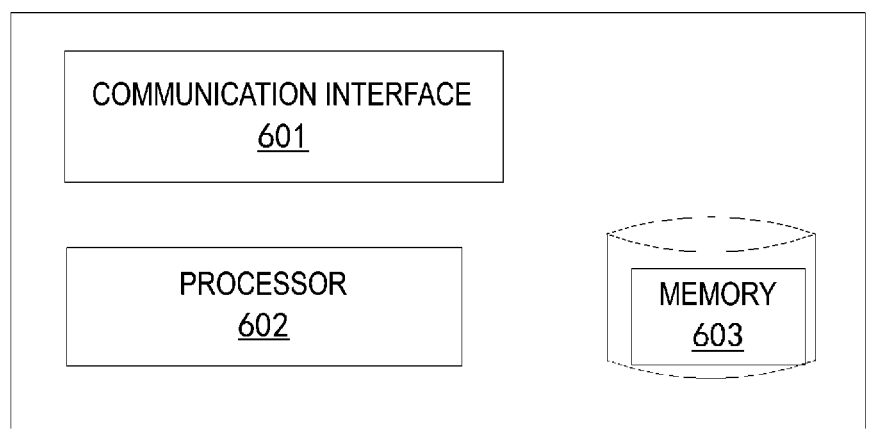
FIG. 6 schematically shows a structural block diagram of a base station for performing a method for delivering a data packet according to an exemplary embodiment of the present invention.

The structure of a base station according to an exemplary embodiment of the present invention will be described below with reference to FIG. 6. FIG. 6 schematically shows a structural block diagram of a base station for performing a method for delivering a data packet according to an exemplary embodiment of the present invention. The base station 600 can be used for performing the method 500 described with reference to FIG. 5. For the sake of simplicity, only a schematic structure of the base station according to the exemplary embodiment of the present disclosure is described herein, and details already described in the method 500 as described above with reference to FIG. 5 are omitted.

As shown in FIG. 6, the base station 600 includes a communication interface 601 configured to perform external communication; a processing unit or a processor 602, where the processor 602 may be a single unit or a combination of a plurality of units configured to perform different steps of the method; and a memory 603 storing computer-executable instructions that, when executed by the processor 602, cause the processor 602 to perform the following process:

performing a QoS flow configuration for UE, where the QoS flow configuration includes a QoS flow identifier and at least one of the following identifiers:

a PDU session identifier associated with a QoS flow indicated by the QoS flow identifier, a DRB identifier associated with the QoS flow indicated by the QoS flow identifier, an SDAP identifier associated with the QoS flow indicated by the QoS flow identifier, and an identifier of a default DRB associated with the QoS flow indicated by the QoS flow identifier; and sending the QoS flow configuration to the UE through an RRC message.

In one exemplary embodiment, when executed by the processor, the instructions may further cause the processor to perform the following process: receiving, according to a mapping rule between the QoS flow identifier and the at least one associated identifier in the sent QoS flow configuration, a data packet on a DRB corresponding to the at least one identifier.

The program running on the device according to the present disclosure may be a program that enables a computer to implement the functions of the embodiments of the present disclosure by controlling a central processing unit (CPU). The program or information processed by the program can be stored temporarily in a volatile memory (for example, a random access memory (RAM)), a hard disk drive (FWD), a non-volatile memory (for example, a flash memory), or other memory systems.

The program for implementing the functions of the embodiments of the present disclosure may be recorded on a computer-readable recording medium. The corresponding functions can be achieved by reading programs recorded on the recording medium and executing them by the computer system. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications can be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A method performed by UE comprising:
receiving a RRC message including a Data Radio Bearer, DRB, configuration which associates a DRB to a Service Data Adaptation Protocol, SDAP, entity, wherein,
   the SDAP entity is configured for a Protocol Data Unit, PDU, session, and
   one or more DRBs are established for the PDU session,
releasing the configured SDAP entity, if all DRBs associated to the SDAP entity are released,
indicating, to a Non Access Stratum, NAS, layer, the SDAP entity is released for the PDU session.

2. A method performed by a base station, comprising:
transmitting a RRC configuration including a Data Radio Bearer, DRB, configuration which associates a DRB to a Service Data Adaptation Protocol, SDAP, entity, wherein,
   the SDAP entity is configured for a Protocol Data Unit, PDU, session,
   one or more DRBs are established for the PDU session, and
   the RRC configuration causes a UE to:
   release the configured SDAP entity, if all DRBs associated to the SDAP entity are released,
   indicate, to a Non Access Stratum, NAS, layer, the SDAP entity is released for the PDU session.

3. A user equipment, UE, comprising:
a processing circuitry configured and/or programmed to:
receive a RRC message including a Data Radio Bearer, DRB, configuration which associates a DRB to a Service Data Adaptation Protocol, SDAP, entity, wherein,
   the SDAP entity is configured for a Protocol Data Unit, PDU, session, and
   one or more DRBs are established for the PDU session,
release the configured SDAP entity, if all DRBs associated to the SDAP entity are released, indicate, to a Non Access Stratum, NAS, layer, the SDAP entity is released for the PDU session.

4. A base station, comprising:
a processing circuitry configured and/or programmed to:
transmit a RRC configuration including a Data Radio Bearer, DRB, configuration which associates a DRB to a Service Data Adaptation Protocol, SDAP, entity, wherein,
   the SDAP entity is configured for a Protocol Data Unit, PDU, session,
   one or more DRBs are established for the PDU session, and
   the RRC configuration causes a UE to:
   release the configured SDAP entity, if all DRBs associated to the SDAP entity are released,
   indicate, to a Non Access Stratum, NAS, layer, the SDAP entity is released for the PDU session.

* * * * *